United States Patent [19]

Henry

[11] Patent Number: 5,052,265
[45] Date of Patent: Oct. 1, 1991

[54] METHOD OF RECORDING FINGERING POSITIONS FOR STRINGED MUSICAL INSTRUMENTS

[76] Inventor: Carl S. Henry, 102 Ellsworth St., Newington, Conn. 06111

[21] Appl. No.: 467,686

[22] Filed: Jan. 19, 1990

[51] Int. Cl.⁵ .............................................. G09B 15/02
[52] U.S. Cl. .................................... 84/483.2; 101/368
[58] Field of Search ........................ 84/483.2; 101/368

[56] References Cited

U.S. PATENT DOCUMENTS

| | | | |
|---|---|---|---|
| 1,053,366 | 2/1913 | Dickson | 84/483.2 |
| 1,108,314 | 8/1914 | Anderson | 101/368 X |
| 3,403,623 | 8/1968 | Blackwood | 101/368 |
| 3,477,715 | 10/1969 | Nekton | 273/136 |
| 3,700,785 | 10/1972 | Leonard | 84/483.2 |
| 3,951,062 | 1/1974 | Abrahamson | 101/426 |

*Primary Examiner*—Brian W. Brown

[57] ABSTRACT

Fingering positions, musical techniques and effects are rapidly and accurately recorded in a written musical repertoire by reproducing, duplicating or imprinting, as by stamping, a graphic representation of the fingerboard of a musial instruments in the appropriate section of a lyric sheet, music sheet or chord chart, thereafter marking or noting on the reproduction or imprint, or adjacent thereto, the placement of fingers in preferred arrangement and the like. The imprint or reproduction can be made by means of a rubber stamp or similar ink transfer or reproducing device, which bears on one or more surfaces, the raised configuration of the graphic representation thereof, which after inking can be applied to the proper section of the written musical repertoire. This method and device affords both time saving and extremely accurate musical information for immediate and future reference.

6 Claims, 1 Drawing Sheet

METHOD OF RECORDING FINGERING
POSITIONS FOR STRINGED MUSICAL
INSTRUMENTS

BACKGROUND OF THE DISCLOSURE

Players of musical instruments with fingerboards must keep accurate records of the fingering positions, musical techniques and effects in their repertoire. This can be a laborious and time consuming task, particularly where unfamiliar or customized non standard information is involved. It is imperative that the placement of fingers in preferred arrangement and the like appear in the appropriate section of a lyric sheet, music sheet or chord chart to act as an instantaneous guide during practice and performance of such pieces. Previously, musicians have had to resort to either lengthy descriptive musical terminology to record their preferences or to include a laboriously hand drawn rough drawing corresponding to the fingerboard, which is time consuming and not conducive to the necessary accuracy and clarity as indicated above.

It is acknowledged that similar charts are to be found in textbooks. However, for the practicing and performing musician, there are an infinite number of situations that require musical information be noted on paper both accurately and yet quickly, to conserve a busy musician's time. Thus a diagram of the fingerboard of a musical instrument or graphic representations thereof, which are instantaneously reproducible in the proper place on a lyric sheet, music sheet or chord chart, considering the numerous possibilities, would be of inestimable value in furthering accuracy in the written repertoire as well as enabling the musician to make the most efficient use of his time and meet the demands thereon. Prior to the present invention, no such method and means therefore, are know to have existed.

SUMMARY OF THE INVENTION

Briefly, the present invention provides a novel method and novel means therefore, for the quick and extremely accurate recording of fingering positions, musical techniques and effects on a lyric sheet, music sheet or chord chart. More specifically, the invention involves the use of a single figure or diagram reproducing device, such as a rubber stamp or similar reusable inked image transfer device, to make a facsimile imprint or diagram of a fingerboard of a musical instrument, or a graphic representation thereof, instantly, when and where required in a musician's written repertoire, and in the necessary scale. The musician can then note on the graphically clear fingerboard diagram or representation, or adjacent thereto, symbols for his preferred fingering positions, musical techniques and effects and the like, without the necessity for using lengthy and possibly imprecise terminology or hand drawing laboriously and roughly, a fingerboard diagram. Not only does the invention provide immediate benefits in timesaving and accuracy, but lends itself to easy and accurate reference in follow-up rehearsals and performances. The device employed would reproduce the exact same imprint or reproduction each time, without any variations.

BRIEF DESCRIPTION OF THE DRAWINGS

The above cited means for practicing the invention can best be illustrated by reference to specific examples and as shown in the accompanying drawings.

DESCRIPTION OF THE PREFERRED EMBODIMENTS

As indicated above, the practicing and performing musician is constantly faced with demands to expand his repertoire, a situation which, in turn, makes greater demands on a musician's time. Up until now, musicians have as briefly as possible recorded their fingering positions, musical techniques and effects, in either lengthy musical terminology or have tried to roughly chart their preferences by hand drawing on their lyric sheet, music sheet or chord chart. It is clearly imperative, that, in view of the necessity for frequent repeat performances or practices as well, that the record be as complete and accurate as possible. Moreover, the demands on a musician's time are such, that ease and quickness of making the required record entries are also of great importance.

Figure 1:
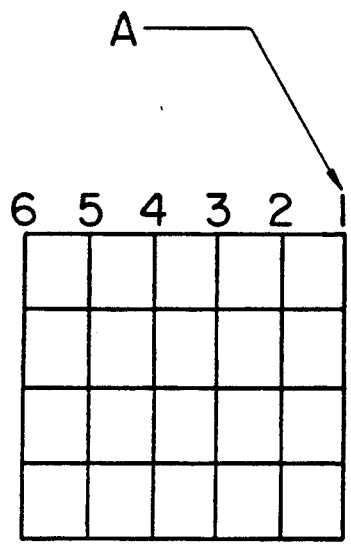
In FIG. 1, there is shown a plan view of the inking surface of a diagram representing a stringed musical instrument's fingerboard. The vertical lines represent the strings and the interconnecting horizontal lines represent the frets. By marking the diagram with standard or personalized symbols, the musician can record his preference for, but not limited to, FIG. 1,A, arrangement and tuning of strings, FIG. 2, B, placement of specific fingers, muted strings or strings not played, strings left open, and the number of the fret at which a chord is located. This figure is merely by way of illustrative example only and is in no way intended to be limiting as to the scope. Obviously, similar applications can be made with respect to musical instruments with a greater or fewer number of strings, for example, as will occur to the practitioner in the art within the scope of this invention.
Figure 2:
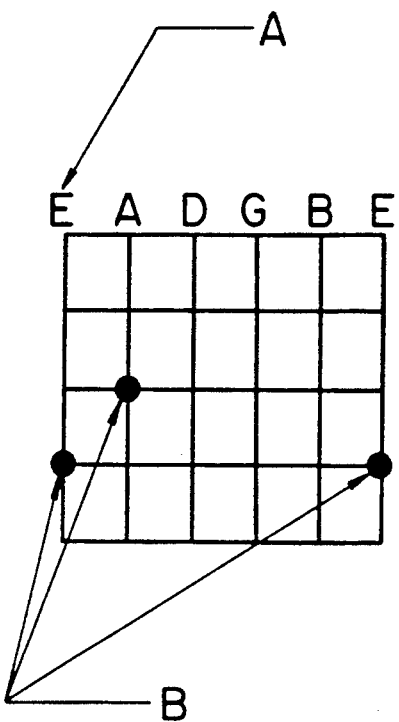
Figure 3:
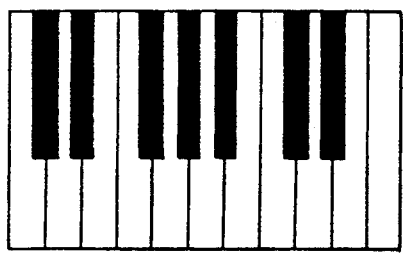
FIG. 3 shows a plan view of the inking surface of a diagram representing a musical instrument's keyboard. This figure is merely by way of illustrative example only and is in no way intended to be limiting as to the scope. Obviously, similar applications can be made with respect to musical instruments with a greater or fewer number of keys, a different arrangement of keys and keys of a different shape.
Figure 4:
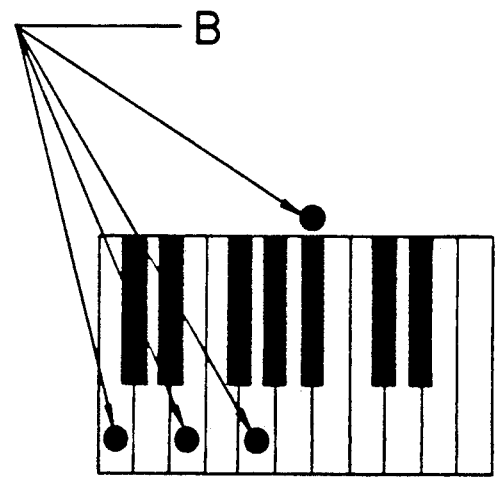
FIG. 4 shows an example of how a musician might record his fingering preference B, on a keyboard.

By use of such a fingerboard diagram or graphic representation or reproduction device as shown in FIGS. 1 and 3, or the like, the musician can reproduce, imprint or stamp in his written repertoire and diagram and record his preference, e.g. of fingering positions, musical techniques and effects on a fretted or unfretted stringed musical instrument, by using appropriate markings and symbols:

1. Precise location of specific fingers.
2. Muted strings or strings not played.
3. Strings left open.
4. The number of the fret at which a chord is located.
5. Arrangement and tuning of strings.
6. Vibrato, bends, hammers and other techniques used by musicians to obtain desired musical effects.

Follow up rehearsals and performances become more time efficient and precise as a result of the invention. The invention is particularly valuable in recording stylized, non-standard fingering positions.

The inked reproduction device of the invention facilitates accurate recording of preferences for the record, it removes the necessity for rough and inaccurate drawings. Fingering positions, musical techniques and effects are accurately recorded for easy recall. Reference is made to the "description of the drawings" above and are included herewith by way of illustration of this preferred embodiment.

Although the drawing illustrates only one imprint on a rubber stamp, the invention can obviously be designed to include multiple faces that reproduce various symbols, styles, sizes and the like.

A similar method and device can be used in charting information for other musical instruments. As another non-limiting example, a keyboard player can indicate on a suitable reproducible representation of a keyboard fingerboard locations of desired fingering positions and the like.

Although the invention has been described with respect to specific details of certain embodiments thereof, it is not intended that such details act as limitations upon the scope of the invention except insofar as set forth in the accompanying claims.

I claim:

1. A method of recording musical information in a musician's written repertoire which comprises: reproducing on an appropriate section of a lyric sheet of said written repertoire by means of a single ink transfer reproducing device, a diagram representing a fingerboard of a stringed musical instrument, said diagram comprising a series of parallel vertical lines representing strings of said stringed musical instrument; and a series of interconnecting parallel horizontal lines representing frets of said stringed musical instrument; and, appropriately marking said diagram for accurately depicting fingering positions relating to said written repertoire.

2. The method of claim 1 wherein said single ink transfer reproducing device is a hand inking rubber stamp.

3. The method of claim 1 wherein said single ink transfer reproducing device is a self inking rubber stamp.

4. A method of recording musical information in a musician's written repertoire which comprises: reproducing on an appropriate section of a lyric sheet of said written repertoire by means of a single ink transfer reproducing device, a diagram representing a keyboard of a stringed musical instrument, said diagram comprising a main rectangle having two sides, a top edge, and a bottom edge, a first series of vertical lines extending from said top edge to said bottom edge parallel to said sides, a series of rectangles, each rectangle of said series of rectangles extending from said top edge toward said bottom edge parallel to said sides and terminating at a point located substantially half way between said top edge and said bottom edge, a second series of vertical lines, each line of said second series of vertical lines extending from said bottom edge toward said top edge parallel to said sides and terminating at one of said rectangles of said series of rectangles; and, appropriately marking said diagram for accurately depicting fingering positions relating to said written repertoire.

5. The method of claim 4 wherein said single ink transfer reproducing device is a hand inking rubber stamp.

6. The method of claim 4 wherein said single ink transfer reproducing device is a self inking rubber stamp.

* * * * *